United States Patent [19]

Kuwashiro

[11] Patent Number: 4,809,234
[45] Date of Patent: Feb. 28, 1989

[54] MEMORY DEVICE INCLUDING MEMORIES HAVING DIFFERENT CAPACITIES

[75] Inventor: Yutaka Kuwashiro, Kamakura, Japan
[73] Assignee: Mitsubishi Denki K.K., Tokyo, Japan
[21] Appl. No.: 46,424
[22] Filed: May 6, 1987
[30] Foreign Application Priority Data
   May 23, 1986 [JP] Japan .................. 61-77840
[51] Int. Cl.⁴ ............................ G11C 8/00
[52] U.S. Cl. ...................... 365/230; 364/900
[58] Field of Search .......... 365/189, 230, 52, 63, 365/233, 226; 364/200 MS File, 900 MS File

[56] References Cited
U.S. PATENT DOCUMENTS

| | | | |
|---|---|---|---|
| 4,400,794 | 8/1983 | Koos | 365/63 |
| 4,468,731 | 8/1984 | Johnson et al. | 364/200 |
| 4,545,010 | 10/1985 | Salas et al. | 364/200 |
| 4,566,082 | 1/1986 | Anderson | 365/230 |
| 4,675,808 | 6/1987 | Grinn et al. | 365/230 |

OTHER PUBLICATIONS

'85 Mitsubishi Semiconductor Data Book, (1C Memory vol.), Applications—64K-Bit Dynamic RAM Designs, Mitsubishi Electric Semiconductor Data Editorial Committee.

Primary Examiner—Stuart N. Hecker
Assistant Examiner—Glenn A. Gossage
Attorney, Agent, or Firm—Takeuchi Patent Office

[57] ABSTRACT

A memory device includes a plurality of memory arrays, each having a plurality of memory elements, placed in a memory address space, a memory array selecting device responsive to the address information for designating a given address in the memory address space to select one memory array from the plurality of memory arrays, an address generating device for generating the row and column addresses of the selected memory array, and a setting device for setting memory element information corresponding to the capacity of memory elements in each of the memory arrays, the memory array selecting device responsive to the address information and the memory element information for decoding corresponding to the memory capacity to select the desired memory array, and the address generating device responsive to the address information to generate the row and column addresses of the memory array consisting of memory elements of the maximum capacity.

8 Claims, 8 Drawing Sheets

MEMORY DEVICE INCLUDING MEMORIES HAVING DIFFERENT CAPACITIES

BACKGROUND OF THE INVENTION

1. Field of the Invention

The present invention relates to memory devices to be placed in the memory address space of a computer using a microprocessor.

2. Description of the Prior Art

FIGS. 2A and 2B show in block diagrams a memory device using 64 kilobit DRAM (hereinafter "64 KDRAM") according to the prior art and the essential part thereof, respectively. FIGS. 3A and 3B illustrate in block diagrams a memory device using 256 KDRAM according to the prior art and the essential part thereof, respectively. In the figures there is shown a microprocessor or system bus 1 of a computer using a microprocessor. A number, n, of memory arrays 2 are placed in the memory address space of, for example, one megabyte of the system bus 1. Each memory array 2 is composed of eight 64-KDRAMs (in FIG. 2) or eight 256-KDRAMs (in FIG. 3).

Denoted at 3 is an address decoding circuit for selecting one memory array from the n memory arrays 2. Denoted at 4 is a memory timing circuit for the memory arrays 2, and at 5 an address multiplexer for generating a memory address for each memory array. Denoted at 6, 7, and 8 are row address strobe (RAS), column address strobe (CAS), and write enable (WE) driver circuits, respectively, for each memory array 2 selected by the address decoding circuit 3. Denoted at 9 is a refresh controller for determining the refreshing timing of the memory array 2, at 10 a refresh address counter counted up or down on demand by the refresh controller 9, and at 11 an arbiter for performing arbitration between the demand from the refresh controller 9 and the demand for access to the memory from the microprocessor or system buss 1. The address decoding circuit 3 and the address multiplexer 5 constitute memory array selecting means and address generating means, respectively, of this memory device.

In operation, on access to a memory array 2, the microprocessor or system bus 1 outputs address information (a) corresponding to the address space, command information (b) for read or write control and its timing, and bit parallel data (c). The address decoding circuit 3 then tries to determine which memory array 2 has been selected by decoding with the aid of a few upper bits of the address information (a) and the command information (b). If any memory array 2 has been selected, it feeds the arbiter 11 with a RAM demand signal (d). It also outputs a memory bank selecting signal (e) for the selected memory array 2.

The RAS, CAS, and WE driver circuits 6, 7, and 8 then feed the selected memory array 2 with strobe signals (f), (g), and (h) according to the timing signals generated by the memory timing circuit 4. The address multiplexer signal (i) from the memory timing circuit 4 allows the address multiplexer 5 to switch between the row and column addresses for allocating the row or column of the memory array 2 from the lowest bit of the address information so as to access a given address of the memory array 2 selected by the address decoding circuit 3. At this point, the data are transferred through the data bus (c). The refresh demand signal (j) from the refresh controller 9 allows refresh of all the memory arrays 2. In the devices of FIGS. 2 and 3, only the RAS is refreshed. The address for this is output from the the refresh address counter 10, and a READY signal (k) is fed to the microprocessor or system bus 1. The arbiter 11 makes a decision on the dispute between the memory access and refresh demands.

If the microprocessor or system bus 1 has a capacity of 20 bits of the address information (a) and 8 bits of the data (c), the lower 16 bits (A0-A15) and the upper 4 bits (A16-A19) are used for a memory address and address decoding, respectively, in the system using 64 KDRAM of FIG. 2, and each memory array 2 has 64 kilobytes of address space. The lower 18 bits (A0-A17) and the upper 2 bits (A18-A19) are used for a memory address and address decode, respectively, in the system using 256 KDRAM, and each memory array 2 has 256 kilobytes of address space.

However, the capacity of the aforementioned prior memory devices can be expanded by units of only 64 kilobytes in the memory device using 64 KDRAMs or only 256 kilobytes in the memory device using 256 KDRAMs. If the capacity of the latter memory device is desired to be expanded by 64 kilobytes, it is necessary to change the address decoding conditions and to use an entire memory array of 256 KDRAMs.

SUMMARY OF THE INVENTION

Accordingly, it is an object of the invention to provide a memory device on which memory elements of different capacities from array to array can be mounted.

According to the present invention there is provided a memory device which comprises setting means for setting memory element information corresponding to the capacity of memory elements in each of the memory arrays, the memory array selecting means responsive to the address information and the memory element information for decoding corresponding to the memory capacity to select the desired memory array, and the address generating means responsive to the address information to generate the row and column addresses of the memory array consisting of memory elements of the maximum capacity.

The memory array selecting means according to the invention is responsive to the memory element information and the address information to select a memory array so that a plurality of memory arrays each consisting of memory elements of different capacities may be placed in the continuous memory address space and that the address generating means may be adapted to generate the row and column addresses corresponding to the memory capacity of the selected memory array.

Other objects, features, and advantages of the invention will be apparent from the following description in conjunction with the accompanying drawings.

DESCRIPTION OF THE PREFERRED EMBODIMENTS

Figure 1A:
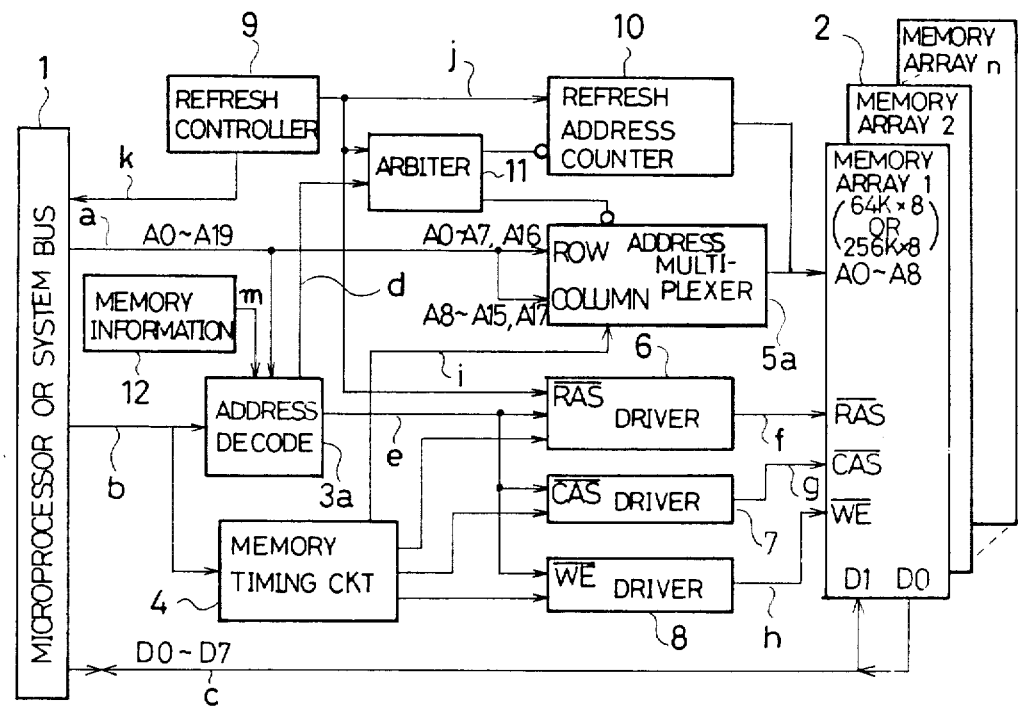
FIGS. 1A and 1B are block diagrams of a memory device embodying the present invention and the essential part thereof.
Figure 1B:
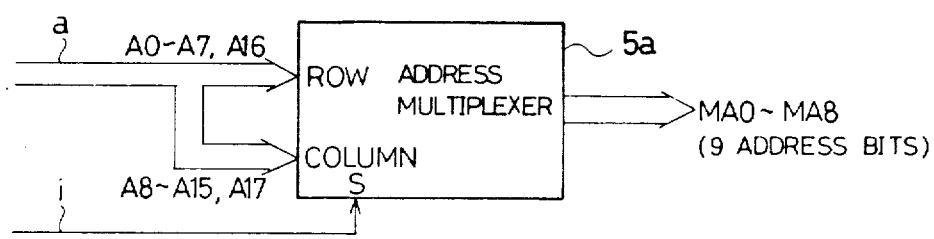
Figure 2A:
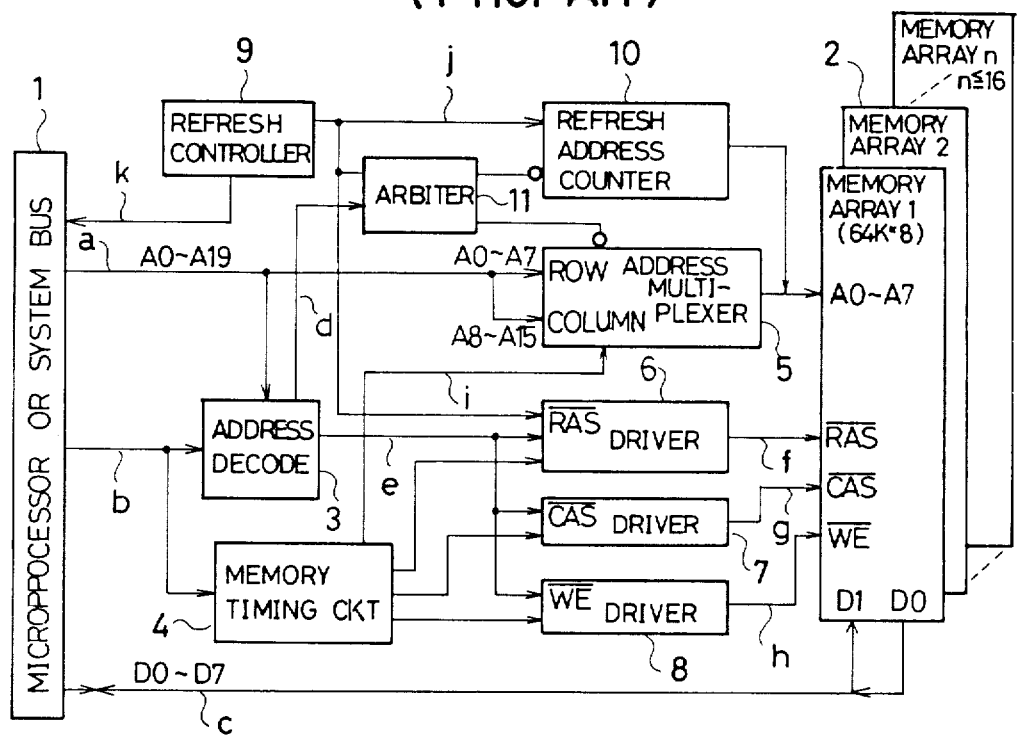
FIGS. 2A and 2B are block diagrams of a memory device using 64 KDRAMs according to the prior art and the essental part thereof.
Figure 2B:
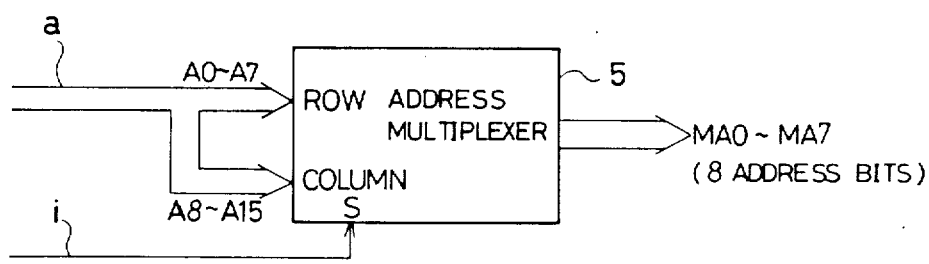
Figure 3A:
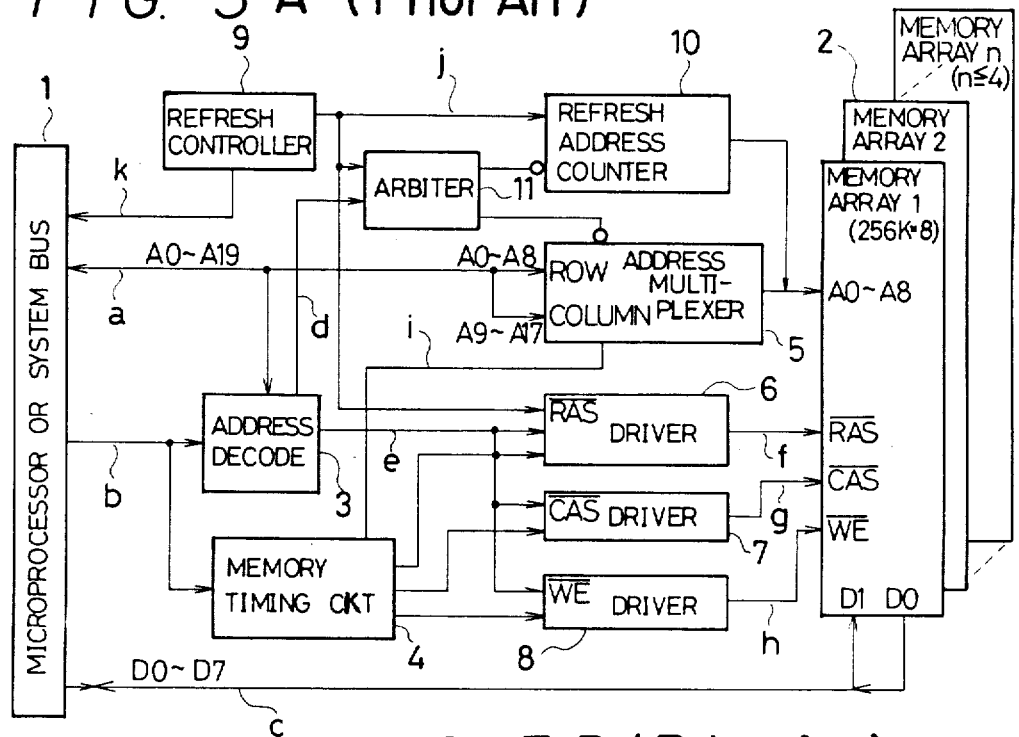
FIGS. 3A and 3B are block diagrams of a memory device using 256 KDRAMs according to the prior art and the essental part thereof.
Figure 3B:
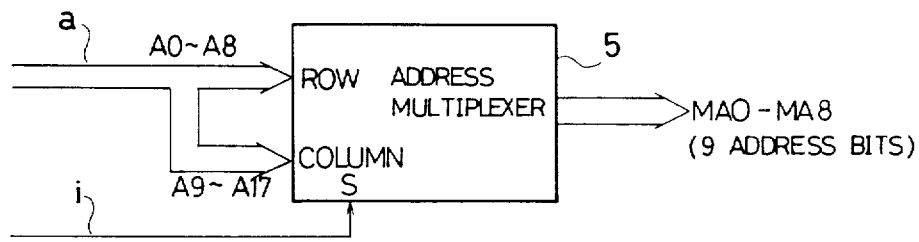

Referring now to FIGS. 1A and 1B there are shown in block form a memory device embodying the present invention and the essential part thereof, respectively. The parts identical with those of the prior devices in FIGS. 2 and 3 are given the same reference numerals and their description will be omitted. Setting means or a switch 12 enables one to set memory information (m) as many as the number of memory arrays. Unlike the conventional circuit, memory array selecting means or an address decoding circuit 3a is adapted to select a memory array 2 based on both the address information (a) and the memory element information (m) set by the switch 12. Address generating means or an address multiplexer 5a is adapted so that the address information (a) may have a row address of A0-A7 and A16 and a column address of A8-A15 and A17, which is switchable between them, as shown in FIG. 1B.

In operation, when the microprocessor or system bus 1 makes an access to the memory array 2, the parts identical with those of the conventional technology function in the same manner as the conventional ones. Since both 64 KDRAM and 256 KDRAM are pin compatible with each other except for the first pin, either 64 or 256 KDRAM may be mounted in a memory array by switching between 9 bits (A0-A7 and A16) of a row address and 9 bits (A8-A15 and A17) of a column address of the address information (a) from the microprocessor or system bus 1 as shown in FIG. 1B.

If there are three such memory arrays 2 which are allocated in the continuous area from a given address in the address space viewed from the processor, the use of 64 KDRAMs gives the minimum memory capacity of 192 KB while the use of 256 KDRAM gives the maximum memory capacity of 768 KB. In order to allow access to a given memory array 2 consisting of different memory elements, the address decoding circuit 3a responds to the memory element information (m) to output a bank selecting signal (e) corresponding to each memory array 2. In order to access the n-th array of the memory arrays 2, it is possible to decode $2^n$ addresses for continuous allocation of all the memory arrays 2.

In the above illustrated embodiments, the present invention has been applied to the 64 or 256 KDRAMs capable of reading and writing but requiring refreshing, but it is not limited to the above specific capacity but also is applicable to SRAMs requiring no refreshing and various types of ROMs capable of only reading.

With the memory device according to the invention, which comprises setting means for setting memory element information corresponding to the capacity of memory elements in each of the memory arrays, the memory array selecting means responsive to the address information and the memory element information for decoding corresponding to the memory capacity to select the desired memory array, and the address generating means responsive to both the address information to generate the row and column addresses of the memory array consisting of memory elements of the maximum capacity, it is possible to mount memory elements of capacities different from array to array in the memory device.

Some subsystems of this memory device will be described in more detail. It is assumed that the capacity of a microprocessor or system bus 1 has 20 bits of address information (a) and that there are three memory arrays 2, which are allocated in a continuous space from the address 100000 (in hexadecimal digits) viewed from the system.

Figure 4:
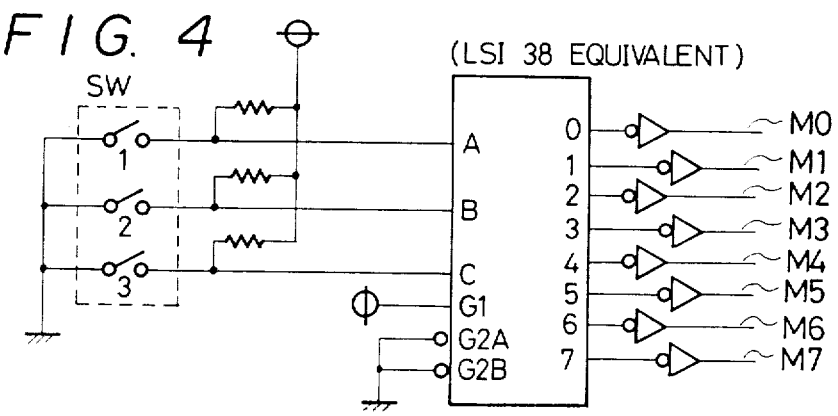
FIG. 4 is a schematic diagram of the memory element information circuit of the memory device of FIG. 1.

(1) Memory Element Information Switch 12:

This has such a configuration as shown in FIG. 4 so as to indicate whether the memory elements mounted in the memory arrays Nos. 1-3 are 64 or 256 KDRAM. When the SW is closed, 64 KDRAMs have been selected. When the SW is opened, on the other hand, 256 KDRAMs have been selected. The SW-1, SW-2, and SW-3 correspond to the memory arrays No. 1, No. 2, and No. 3, respectively. This block decodes the conditions of the SW-1 through SW-3 and feeds them to the address decoding circuit 3a.

Figure 5:
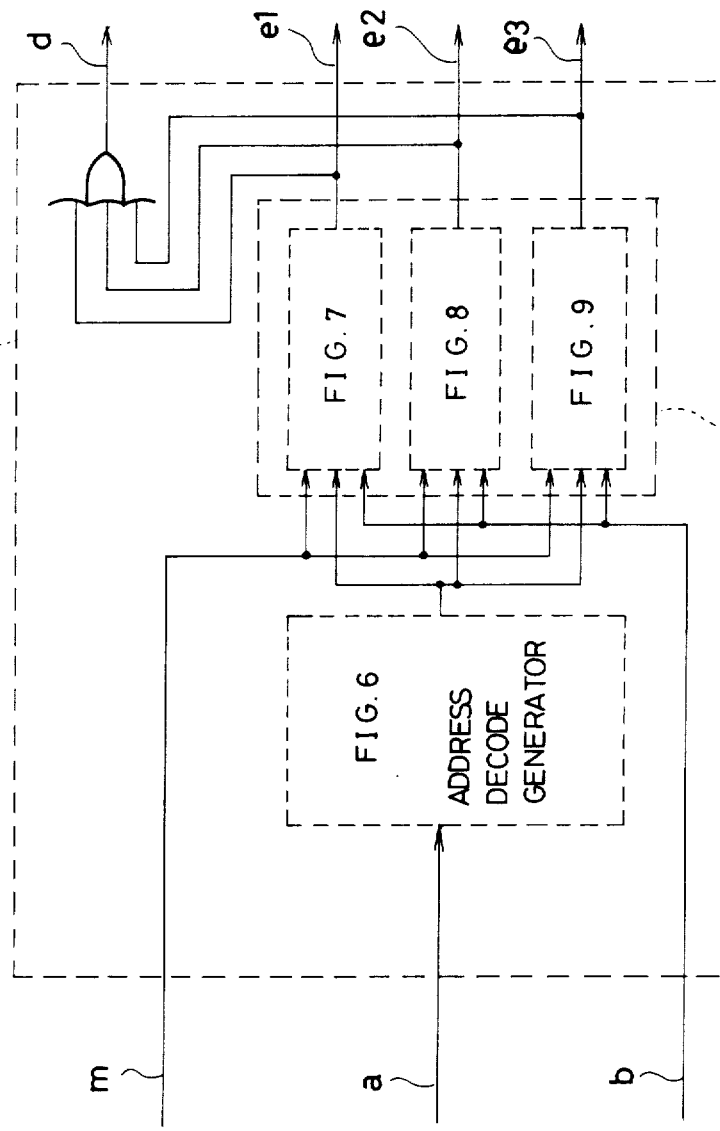
FIG. 5 is a block diagram of the address decoding circuit of the memory device of FIG. 1.
Figure 6:
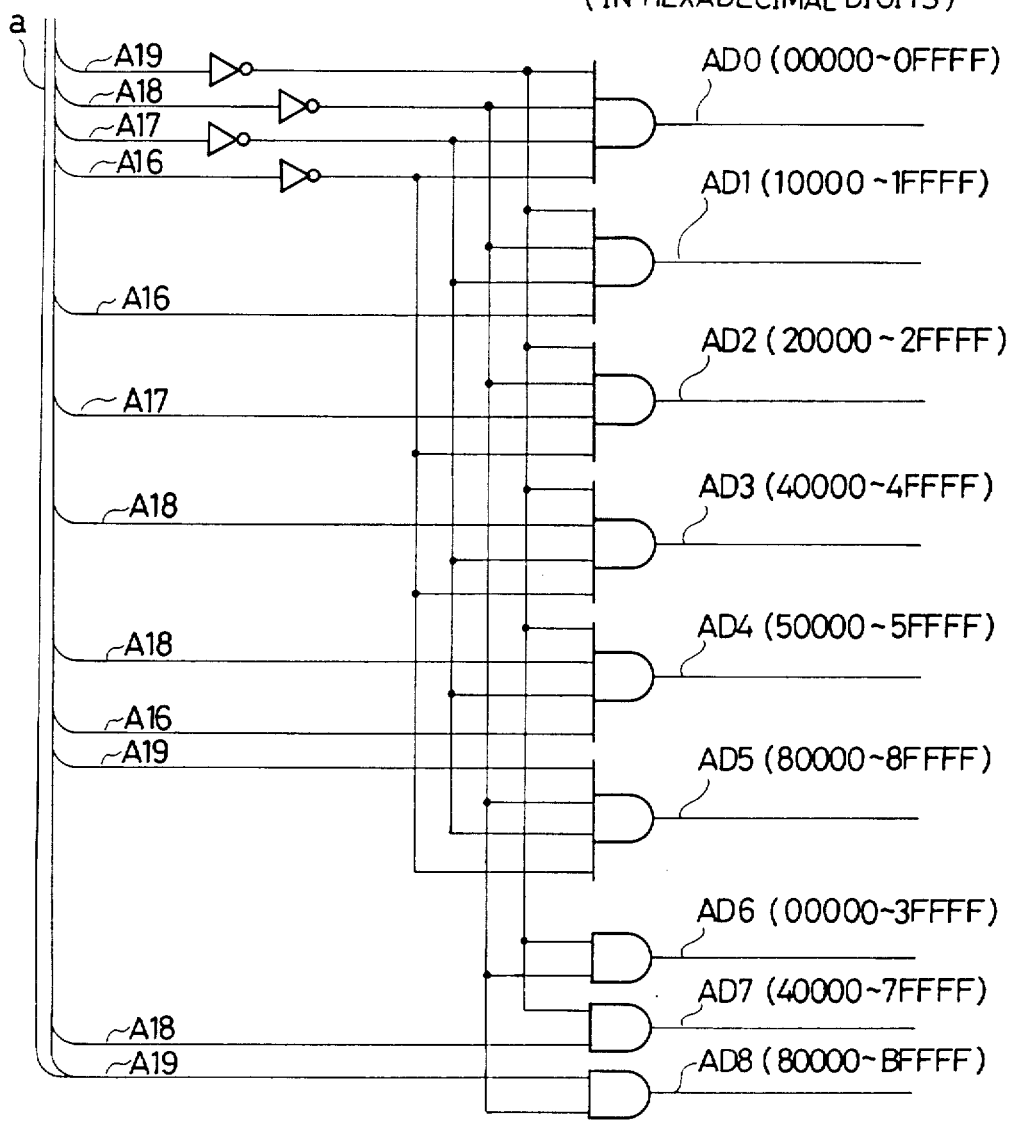
FIG. 6 is a schematic diagram of the address generating circuit of the memory device of FIG. 1.
Figure 7:
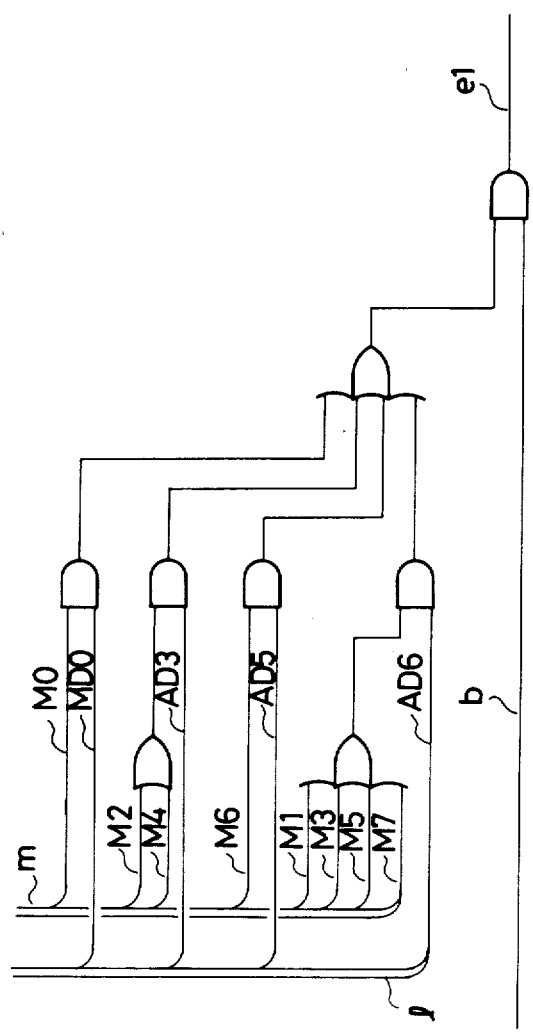
FIG. 7 is a schematic diagram of the memory bank select signal generating circuit for the memory array No. 1 of the memory device of FIG. 1.
Figure 8:
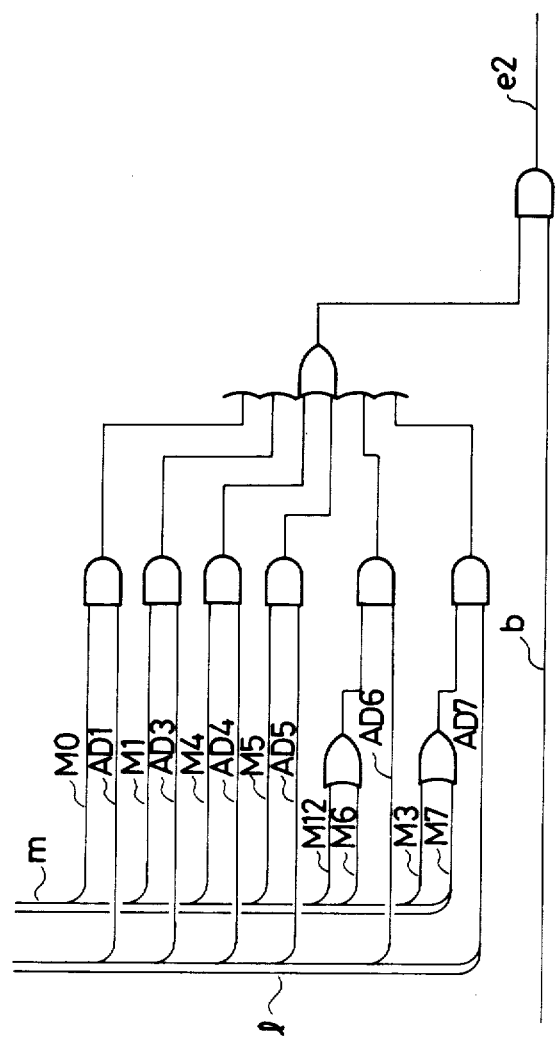
FIG. 8 is a schematic diagram of the memory bank select signal generating circuit for the memory array No. 2 of the memory device of FIG. 1.
Figure 9:
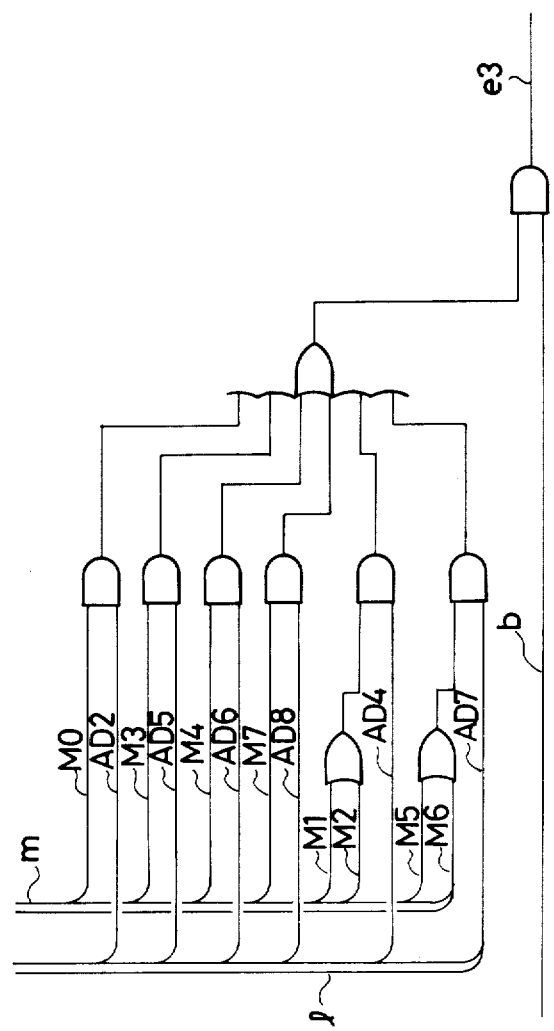
FIG. 9 is a schematic diagram of the memory bank select signal generating circuit for the memory array No. 3 of the memory device of FIG. 1.

(2) Address Decoding Circuit 3a:

FIG. 5 shows in block form the address decoding circuit 3a. FIG. 6 illustrate the address decode generating circuit for decoding the address conditions shown in Table 1. FIGS. 7 through 9 show in block form the circuits responsive to the SW information to generate a memory bank select signal so that the memory bank select signal of each memory array may agree with the address conditions of Table 1.

The address decoding circuit 3a has such a configuration as shown in FIGS. 5 through 9 so as to respond to the information memory element information (m) from the memory element information circuit 12 and the address information (a) and the command information (b) from the microprocessor or system bus 1 to output a memory bank select signal (e) corresponding to each memory array. Upon decoding, the memory bank select signal (e) becomes significant under such address conditions as shown in Table 1 below to select individual memory arrays. e1, e2, and e3 are memory bank select signals for the memory arrays No. 1, No. 2, and No. 3, respectively. m is the output signal (M0 through M7) from the memory element information switch 12. l is the address decode information or output AD0 through AD8 in FIG. 6.

The address decoding conditions of Table 1 is only an example. When there are n memory arrays, the maximum mumber of necessary decoding combinations is $2^n$. The method of access to the memory such as shown in Table 1 will provide the memory space equal to the maximum capacity of the DRAMs mounted in the space continuous from the address 100000 viewed from the system.

While the present invention has been illustrated and described in conjunction with a single preferred embodiment thereof, it is understood that numerous changes and modifications may be resorted to without departing from the spirit and scope of the present invention as defined in the appended claims.

TABLE 1

| Address Decoding Conditions | | | | | |
|---|---|---|---|---|---|
| Memory Element Infor. 12 | | | Address Infor. (a) for Memory Bank Select (e) as Significant | | |
| SW-1 | SW-2 | SW-3 | Memory Ar. #1 | Memory Ar. #2 | Memory Ar. #3 |
| ON | ON | ON | 100000–10FFFF | 110000–11FFFF | 120000–12FFFF |
| OFF | ON | ON | 100000–13FFFF | 140000–14FFFF | 150000–15FFFF |
| ON | OFF | ON | 140000–14FFFF | 100000–13FFFF | 150000–15FFFF |
| OFF | OFF | ON | 100000–13FFFF | 140000–17FFFF | 180000–18FFFF |
| ON | ON | OFF | 140000–14FFFF | 150000–15FFFF | 100000–13FFFF |
| OFF | ON | OFF | 100000–13FFFF | 180000–18FFFF | 140000–17FFFF |
| ON | OFF | OFF | 180000–18FFFF | 100000–13FFFF | 140000–17FFFF |
| OFF | OFF | OFF | 100000–13FFFF | 140000–17FFFF | 180000–18FFFF |

(Note)
1. ON: 64 KDRAMs are mounted. OFF: 256 KDRAMs are mounted.
2. 1XXXXX's are given in hexadecimal digits.

What is claimed is:

1. A memory device including memories having different capacities, which comprises:
    a plurality of memory arrays, each having a plurality of memory elements, placed in a memory address space,
    memory array selecting means responsive to address information for designating a given address in said memory address space to select one memory array from said plurality of memory arrays,
    address generating means for generating row and column addresses of said selected memory array,
    setting means for setting memory element information corresponding to memory capacity of memory elements in each of said memory arrays,
    said memory array selecting means responsive to both said address information and said memory element information for decoding corresponding to said memory capacity to select a desired memory array, and
    said address generating means responsive to said address information to generate row and column addresses in said memory array which are required by memory elements of maximum capacity.

2. The memory device of claim 1, wherein said setting means comprises a switch having a plurality of contacts with which said memory element information about capacities of memory elements to be mounted may be set.

3. The memory device of claim 1, wherein said memory selecting means comprises an address decode circuit for selecting a memory array which consists of memory elements of minimum capacity.

4. The memory device of claim 1, wherein said address generating means comprises an address multiplexer for generating row and column addresses of a memory array.

5. A memory device including memories having different capacities, which comprises:
    a plurality of memory arrays mounted in a memory address space, each having a plurality of memory elements which are identical or different in capacity;
    means for supplying address information;
    memory element setting means for setting memory information for each of said memory arrays;
    memory selecting means responsive to both said address information and said memory information to generate a bank selection signal for selecting a memory array from said memory arrays; and
    address generating means responsive to said address information to generate row and column addresses of said selected memory array which include those addresses required by a memory element of maximum capacity in said memory arrays regardless of capacity of said selected memory array.

6. The memory device of claim 5, wherein said memory arrays each have eight (8) memory elements.

7. The memory device of claim 5, wherein said memory elements are 64 and/or 256 KDRAMs.

8. The memory device of claim 5, wherein said maximum capacity is 256 kilobytes.